United States Patent [19]

Aucel et al.

[11] Patent Number: 4,527,231
[45] Date of Patent: Jul. 2, 1985

[54] METHOD FOR IDENTIFYING THE MODEL OF A THERMAL ENCLOSURE AND APPLICATION TO REGULATION OF THERMAL ENCLOSURE

[75] Inventors: Jean-Claude Aucel, Grasse; Jean-Louis Testud, Paris, both of France

[73] Assignee: La Telemecanique Electrique, Nanterre, France

[21] Appl. No.: 416,444

[22] Filed: Sep. 10, 1982

[30] Foreign Application Priority Data

Sep. 11, 1981 [FR] France ................................. 81 17533

[51] Int. Cl.³ ............................................. G05B 13/04
[52] U.S. Cl. .................................. 364/149; 364/151; 364/161; 364/557
[58] Field of Search ............... 364/148, 149, 150, 151, 364/161, 162, 557, 194; 318/561

[56] References Cited

U.S. PATENT DOCUMENTS

| 3,534,400 | 10/1970 | Dahlin | 364/149 X |
| 4,197,576 | 4/1980 | Sanchez | 364/151 |
| 4,358,822 | 11/1982 | Sanchez | 364/151 |
| 4,368,510 | 1/1983 | Anderson | 364/151 |
| 4,407,013 | 9/1983 | Arcara | 364/149 |

Primary Examiner—Joseph Ruggiero
Attorney, Agent, or Firm—William A. Drucker

[57] ABSTRACT

From a measurement of the response of a thermal enclosure to an action, a set of coefficients representative of the pulsed response of the enclosure as a function of the operating temperature is elaborated by means of an algorithm, each pulsed response is recorded and the model is represented by sets of coefficients stored in different memory blocks connected to a microprocessor or microsystem (53) using the model and a set of algorithms for regulating the enclosure.

9 Claims, 7 Drawing Figures

METHOD FOR IDENTIFYING THE MODEL OF A THERMAL ENCLOSURE AND APPLICATION TO REGULATION OF THERMAL ENCLOSURE

BACKGROUND OF THE INVENTION

The present invention relates to a method for identifying the model of an enclosure to be regulated and the application thereof to the regulation of a thermal enclosure.

THE PRIOR ART

It is known in the regulations to use analog, more especially proportional, integral, and derivative PID regulators which have the disadvantage of having to be adjusted whenever the operating point is changed. These adjustments are, moreover, in general time-consuming, inaccurate and require the skill of specialists. It is also known, to provide regulation using a model representing a process to be controlled; however, the model is formed analogically and can only be an approximation of the representation of the process. Moreover, this model is used with an analog PI regulator.

OBJECT OF THE INVENTION

It is a general object of the invention to provide a method for identifying a digital model for representing a thermal enclosure which is valid whatever the operating point of the enclosure.

An other object of the invention is the construction of a digital regulator using the model representing the enclosure and allowing mismatching of the model with respect to the response of the enclosure to the actions applied by the regulator.

Yet another object of the invention is to automatize the identification and optimum adjustment of the regulator.

SUMMARY OF THE INVENTION

According to one aspect of the invention, the method for identifying the model of an enclosure comprises the following steps:
 applying a power rectangular wave front to the enclosure,
 measuring and recording the temperature response of the enclosure to the said power rectangular wave front and computing, from the said temperature response, the response time of the enclosure;
 generating an identification signal formed of a multiplicity of square waves having a randomly variable height, said square waves further having a randomly variable width is comprised between lower and upper limits which are related to the said response time of the enclosure,
 applying the said identification signal to the enclosure;
 measuring by sampling, calculating and storing the pulsed response of the enclosure to the each of the said square waves;
 calculating the model representing the enclosure from the stored pulsed responses.

According to another feature of the invention, the method identifies a model formed:
 by recording in a first series of memories a first multiplicity of first values determined after sampling at constant time intervals, to obtain a plurality of samples each having a corresponding rank number, said values being representative of the pulsed response of the enclosure as a function of the time for a given operating temperature, said values being stored at addresses corresponding to the rank number of the sample,
 by recording in a second series of memories a second multiplicity of values representative of the variation in the gain of the pulsed responses as a function of the operating temperature, said second values being stored at addresses corresponding to the different operating temperatures,
 by recording in a third series of memories a third multiplicity of values representative of the variation of the sampling period as a function of the different operating temperatures, at addresses corresponding to the temperatures.

According to a third characteristic of the invention, the process is applied to the regulation of an enclosure comprising, in a way known per se, the measurement of the variable to be regulated, a regulation consisting in the elaboration, from the values of the variables and from the reference point, of the action to be imposed on the enclosure, a control acting on the enclosure in response to the action signal and is characterized in that the regulation includes the elaboration of the control signal by a first algorithm set which takes into account the measurement of the output of the enclosure, calculates the future desired behaviour as a function of a desired response time of the regulated system, estimates, by means of the model, the future development of the output and adjusts the future controls, applies the first control, measures and compares the measurement with the estimated values, for applying the following control in the case of adaptation, or carries out a new calculation, a new estimation and a new adjustment before applying the new first control.

BRIEF DESCRIPTION OF THE DRAWING

The invention will be better understood from reading the following description with reference to the accompanying drawings in which.

DESCRIPTION OF THE PREFERRED EMBODIMENT

Figure 1:
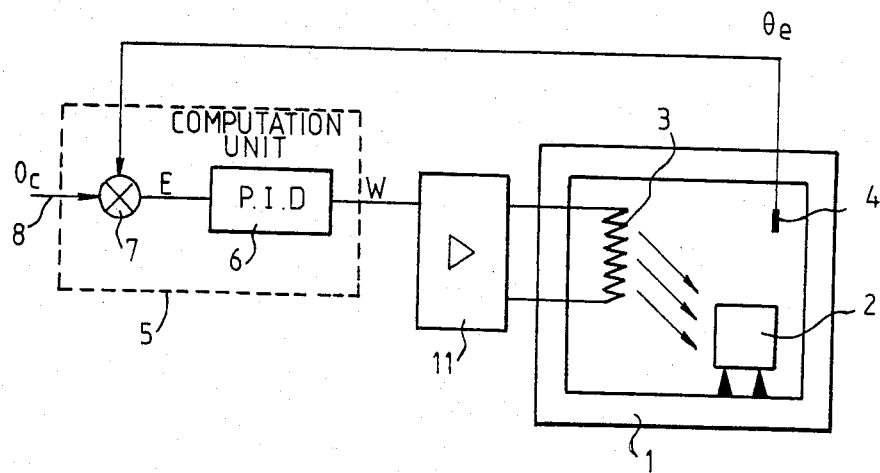
FIG. 1 represents a regulation according the state of the technique.

FIG. 1 shows a process for regulating a thermal enclosure using, in a way known per se, a measuring element 4 formed by a thermocouple or a temperature sensor, a computing element 5 elaborating, from the values of the temperature of enclosure $\theta_e$ and from the reference point $\theta_c$, the control signal W to be applied to control member 11 acting on the procedure to be regulated. The thermal enclosure comprises a heat-insulated enclosure 1, an actuator or electric resistance 3 and a load 2 formed by the objects which it is designed to heat. In this type of conventional setup, the computing element 5 comprises a comparator 7 which elaborates a difference signal between the reference value and the measured value and an independent PID regulator with proportional, integral and derived action which elaborates an analog control signal W from the difference signal.

However, these regulators which operate correctly for a given operating point, require meticulous and delicate adjustment whenever it is desired to change the operating point.

Moreover, when this type of regulator is applied to an enclosure whose characteristics change with time, not only depending on its input but also on other factors such as, for example, a furnace, thermal leaks, the power rated by the resistances, the absorption coefficients of the walls, it is necessary to carry out frequent adjustments of the parameters. These drawbacks and many others are avoided by the device of the invention as will be seen in the following description.

Figure 2:
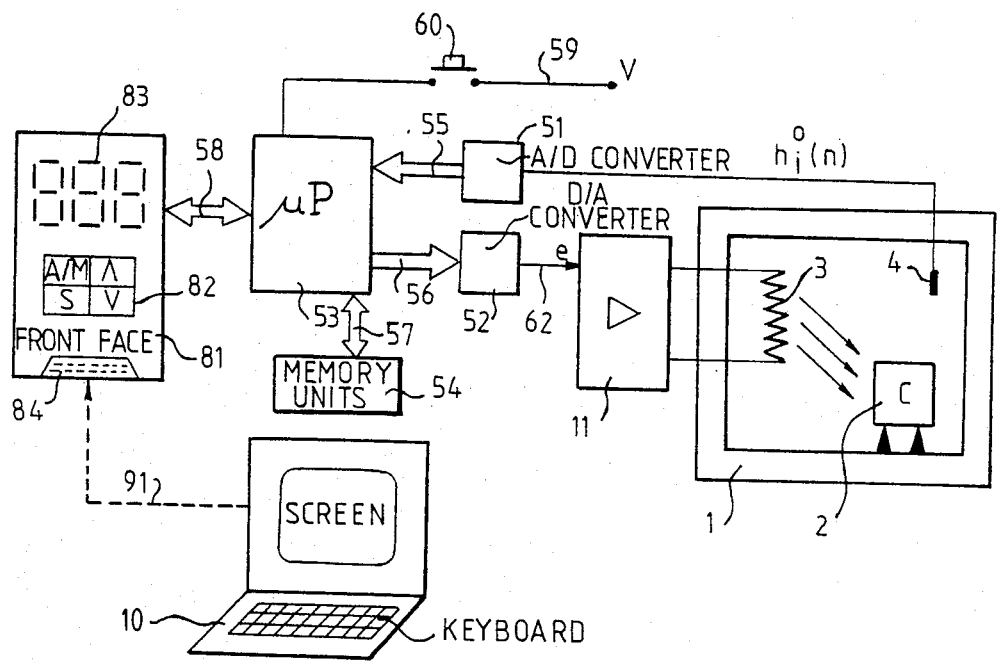
FIG. 2 is a schematical view of a device for implementing the invention.

The regulation device which will be described by way of example with reference to FIG. 2 serves for regulating the temperature of the furnace or thermal enclosure. This device comprises, as before, an enclosure 1, an electric heating resistance coupled to a control device 11 supplying the power, this device being for example a graduator, a load 2 and a thermal couple 4 for measuring the temperature of the enclosure. The output of this thermocouple is connected to the input of an analog-digital converter 51 which is connected to an input bus line 55 of a microprocessor 53. The microprocessor is connected through a first input-output bus line 57 to external memories 54 and, through a second bus line 58, to a front face 81 comprising a keyboard 82, a display element 83 and a dialogue connector 84 which may be connected, by an input-output connection cable 91 shown with a broken line, to a console 10. The role of the connection 91 with the console will be explained further on. The microprocessor or microsystem is connected, by an output bus line 56, to the input of a digital-analog converter 52 whose output is connected, by line 62, to the input of the graduator 11. The microprocessor may also comprise at least one all or nothing input 59 connected, by a contact 60 for signalling, for example, the opening of the door of the furnace, to a voltage source V.

The device is used in two stages, a first so-called identification stage and a second so-called control stage. The device is used in the so-called second control stage without connection 91 with console 10. At the beginning of this stage, memories 54 are loaded with an internal model representing the enclosure, formed by a first set of values stored in a first memory block, this set of values being the coefficients representative of the pulsed response curve of the enclosure, taken at given time intervals defining the storage addresses of these first values; a second set of values representative of the variation curve of gain G of the pulsed responses, for different operating temperatures $\theta_j$ defining the addresses of the second values; a third set of values representative of the variation curve of the sampling periods T allowing the same number of definition points as for the first values, for different temperatures $\theta_j$, defining the addresses of these third values. With these two latter curves, by two suitable mathematical transformations applied to the first curve, all the pulsed response curves of the enclosure can be reconstituted by computation as a function of the different operating temperatures between a maximum operating temperature and a minimum temperature, and thus a representation of the mathematical model of the procedure in an open loop may be obtained.

Then this open-loop model stored in memories 54 is used with a reference model giving the desired behaviour of the looped system so as to determine, by computation, the succession of control signals to be applied to the graduator, depending on the desired response time for the looped system, of the reference temperature to be obtained, and of the starting temperature, which is the one measured in the enclosure by the thermal couple 4 or a temperature censor. The microprocessor or microsystem contains a program which elaborates, depending on the restrictions to be imposed on the system (looped response time, temperature gradient not to be exceeded, etc ... ) a control strategy which it will apply to the open loop model and to the enclosure. From the open loop model it will receive the temperature which the enclosure must reach and from the enclosure it will receive the measured temperature. The comparison of these two temperatures allows the microprocessor to modify, if need be, its control strategy in the case of a mismatch.

The algorithms used for elaborating the control strategy are well known by automation technicians and will be explained further on.

The control signals W are fed in digital form by bus 56 to the digital-analog converter which transmits an analog control signal to control member 11. The temperature of the enclosure changing in response to the control signal is measured by a thermal couple and transmitted in analog form to an analog-digital converter which transmits to the input bus 55 a digital signal. With the keys 82 and display 83, the microprocessor can be caused at the input to take into account the reference temperature to be reached and the desired response time for the looped system, and the restrictions to be imposed on the enclosure which may rotate to the level (value not to be exceeded), or the gradient (restriction concerning the increments). With the display, the temperature of the furnace, among other things, may be visualized at the output. So as to be able to use the device in the so-called control phase, it is necessary to carry out the first so-called identification stage when the regulator is started up. This identification stage consists in elaborating the mathematical model representing the enclosure for an open loop procedure. The model is represented by the pulsed response of the enclosure. To obtain this pulsed response, a four-stage procedure is followed.

The first stage consists in the approximative determination of the response time of the enclosure. For that, the console feeds a signal, in the form of a level, to the enclosure and records and stores in its memory the response curve of the enclosure to the stimuli fed by the console. Then the console calculates, for example by, the original slope method, the response time of the open loop procedure and passes to the second stage. In the second stage, the console elaborates a method of identification. This method consists of a succession of square waves of variable widths and heights. The widths are selected at random, but remain between a maximum width and a minimum width which a man skilled in the art is able to determine in relation with the response time of the enclosure determined during the first stage. This is so as to avoid feeding to the enclosure excitation signals causing a non-significant response for forming the model of the enclosure. The height varies also at random, but takes into account the maximum temperature the furnace can support.

The console also determines the sampling period T of the response signal as a function of the response time $\tau$ of the enclosure and of the number N of desired points for the pulsed response. The sampling period T is calculated so that $N \times T > \tau$, while respecting Shannon's theorem for the choice of T.

Once the method has been elaborated, the console passes to the third stage for forming the model. For that, the console applies to the enclosure the identification method which consists of a succession of square waves. By sampling, the responses to the method are stored in memory and calculations for determining the pulse response of the enclosure are effected.

To effect these calculations, the console uses an identification algorithm such as:

$$h_i^M(n+1) = h_i^M(n) - \frac{\lambda \epsilon(n) e(n-i)}{\underline{E}(n)^T \underline{E}(n)}$$

with $$\epsilon(n) = SM_{(n)} - SO_{(n)} = \sum_{i=1}^{N} [h_i^M(n) - h_i^O(n)] e_{n-i}$$

$h_i^O = i^{th}$ coefficient of the pulsed response of the enclosure
SM: model output
SO: object output
$0 < \lambda < 2$ $$E_n^T = [e_{n-1}, e_{n-2}, \ldots e_{n-N}] \text{ and } E_n = \begin{bmatrix} e_{n-1} \\ e_{n-2} \\ e_{n-i} \\ e_{n-N} \end{bmatrix}$$

$E_n$ is the input vector formed by the values of the inputs at sampling times $n-1, n-2 \ldots n-N$.

$\epsilon_{(n)}$ is equal to the difference between the output of the model at sampling time n and the output of the enclosure called object output.

$\lambda$ is a coefficient whose choice allows for more or less rapid convergence to be obtained and so the determination to be reached more or less rapidly of the value $h_i^M(n)$ representing the $i^{th}$ component of the HM vector at sampling time n. The vector HM is the mathematical representation of the model formed by the coefficients of the pulsed response of the model of the enclosure $HS^T = h_1^M \ldots h_i^M \ldots h_N^M$ for a given operating point.

$E_{(n)}$ is thus given, at a sampling time, by the console and $SO_{(n)}$ measured at sampling time n. Knowing, by the preceding calculations, $h_i^M(n)$, $\epsilon(n)$ and $h_i^M(n+1)$ can be derived therefrom and thus, by degrees, the components defining the pulsed response of the enclosure are determined by a succession of measures carried out by sampling the square wave applied to the input and the signal recovered at the output of the enclosure and by a succession of calculations.

Figure 5:
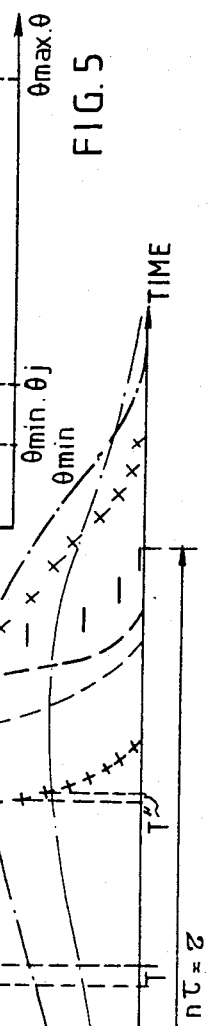
Figure 3:
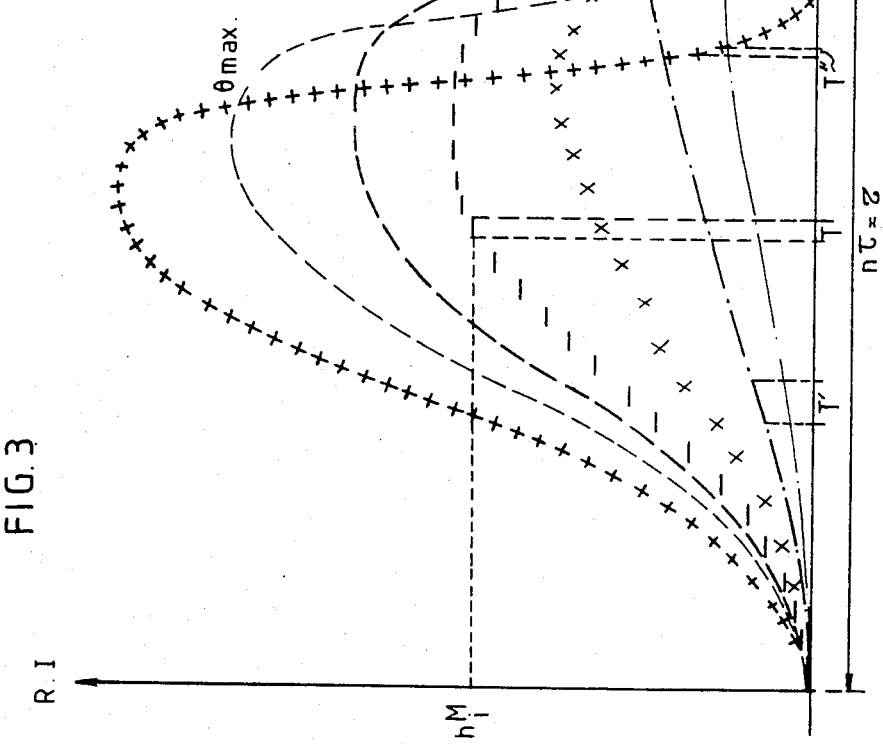
FIG. 3 is a graph showing curves representing the pulsed responses for forming the model.
Figure 6:
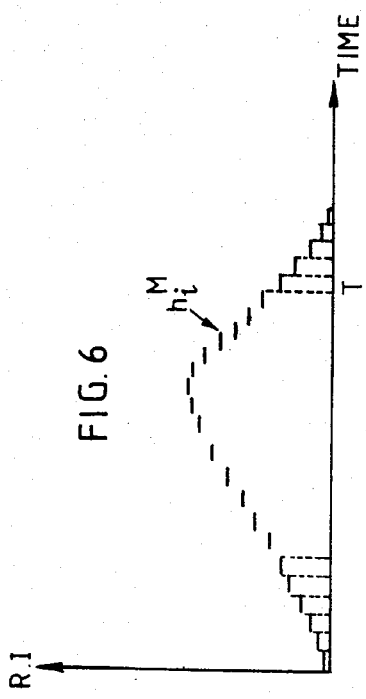

The procedure is the same for a succession of square waves whose average value is situated at different levels corresponding to different operating points. Thus, a family of vectors is obtained representing a family of curves such as those shown in FIG. 3. This family of curves ($HM_1 \ldots HM_u$) representing the pulse responses for different operating points will be parametered while selecting, as shown in FIG. 6, a pulsed response curve $HM_j$, given at an operating temperature $\theta_j$, for a number of sampling points, by the values of the coefficients $h_{ij}^M$ calculated for a given sampling period; then the gain of the response $HM_j$ is determined by calculation as well as other pulsed responses so as to have the variations of the gain as a function of the operating temperature as shown in FIG. 5. The gain $$G_{\theta j} = \sum_{i=1}^{N} h_{ij}.$$

Figure 4:
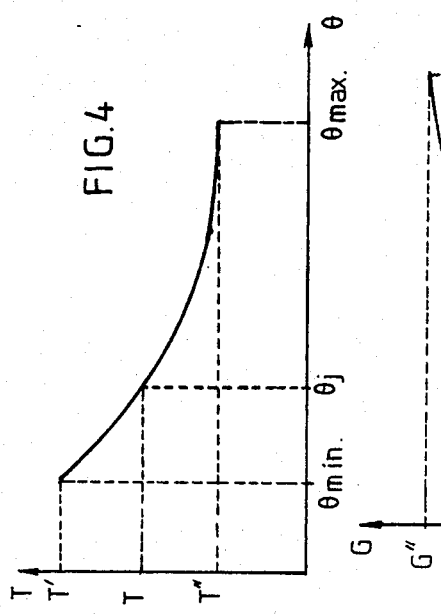
FIGS. 4, 5, 6 show curves illustrating the model representing the enclosure.

The procedure is the same for the sampling period by calculating the values of the sampling period T so that, considering the response time at the different operating temperatures $\tau_{\theta j}$, there is always the same number of sampling points N for a given curve. Thus, the variation of the sampling period is obtained as a function of the temperature of the operating point. The sampling period is determined by $$T = \frac{\tau \theta j}{N}$$

which would allow the curve of FIG. 4 to be represented. With this succession of coefficients representing a sampled pulsed response for a given operating temperature, the variations of the gain as a function of the temperature and the variations of the sampling period as a function of the temperature are stored in the memory of the console until the end of the identification and transferred into memory 54 of the regulator at the end of the identification stage. With this parametered representation of the model, the pulsed response curves at the different operating temperatures may be reconstituted by any suitable mathematical transformation.

The identification stage is terminated by a fourth validation stage which consists in causing the console to generate another identification method different from the first one, in calculating by means of the model the values of the outputs and in checking that the measured values correspond to the calculated values. At the end of this stage, the console transfers the model into the regulator and the regulator can operate alone for controlling the enclosure without the console being connected.

For regulation, the microprocessor uses then the internal model representing the open loop system, a reference model which represents the desired behaviour of the looped system and a control algorithm for calculating the controls to be applied to the enclosure taking into account the past and present controls so that there is coincidence between the desired calculated behaviour and the real behaviour of the system.

In the example considered there has been chosen as representation of the reference model:

$$\left. \begin{array}{l} SMR\ (n+1) = \alpha SO(n) + (1-\alpha)\ CONS \\ \text{and} \\ SMR\ (n+h) = SMR\ (n+h-1) + (1-\alpha)\ CONS;\ h \geq 2 \end{array} \right\} \quad (12)$$

with
 $\alpha = e(T/\tau_r)$
 T sampling period
 $\tau_r$ desired response time of the system
 SMR output of the reference model
 SO output of the measured object
 CONS reference The control algorithm is the dual algorithm of the identification.

The output of the procedure is calculated by the formula using the coefficients $h_i^M$ of the internal model, $$SMI_{(n)} = \sum_i e_{n-i}(n) h_i^M.$$

So, knowing by measurement $SO_{(n)}$ at sampling time n, the outputs of the desired reference model are calculated at times $n+1, n+2, \ldots n+h$ by the formulae (2) in which the object output is known at time n and the reference CONS to be reached.

The future development of the output is estimated by calculating:

$$SMIF_{(n+h)} = HM^T \cdot E_h^*$$

$E_h^*$ is the control vector composed of h future controls and N−h past controls.

Knowing the output of the future internal model, $\epsilon_{(n+h)} = SMIF_{(n+h)} - SMR_{(n+h)}$ is calculated. The future controls are adjusted iteratively, each iteration being broken down into h adjustments to satisfy the h desired coincidence points, by beginning with the one the most distant in the future. This adjustment is made, for each of the components of the future control vector, at each of the coincidence points according to the algorithm $$e_j^* = e_j - \frac{\lambda \epsilon(n+h-i+1) h_j^M}{HM^T \cdot HM}$$

with
j varying from 1 to h−i+1
i varying from 1 to h
λ relaxation coefficient
$e_j$ = value of the $j^{th}$ future control obtained either at the preceding iteration, or by shifting for the first iteration
$e_j^*$ taking the place of $e_j$ at the following iteration
$h_j^M$ = coefficient of the internal model
$\epsilon(n+h-i+1)$ predicted difference at time n
h−i+1 point of coincidence.

The first control is applied to the enclosure causing an output $SO(n+1)$. Knowing $SO(n+1)$, it will be compared with the predicted output and the calculation will be reiterated in the case of a difference: in the case of coincidence, the future calculated control is applied. The operations have then occurred in the following way: measurement of the output of the procedure, calculation of the future desired behaviour, estimation of the future development of the output, adjustment of the future controls, application of the first control, measurement, comparison with the estimated value and new calculation phase in the case of a mismatch; if there is no mismatch, application of the values of the first calculation.

Figure 7:
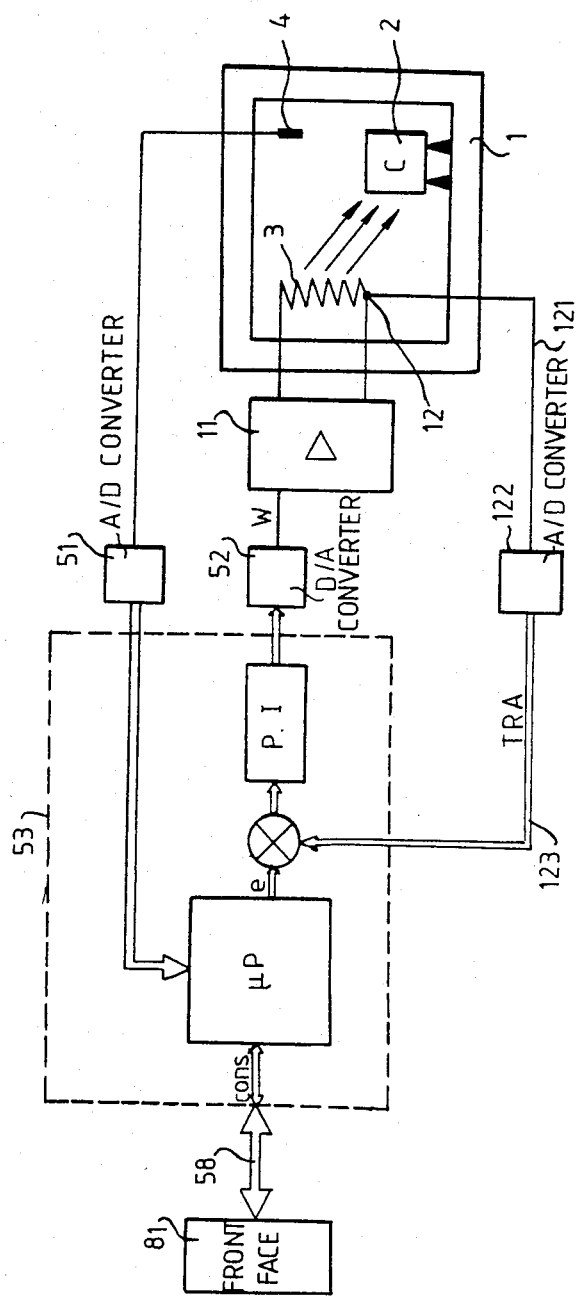
FIG. 7 shows another embodiment of the regulation.

FIG. 7 shows a variation of the regulation device using the principle, known per se, of cascade regulation of the heating resistances and of the enclosure. The aim of this variation is to improve the thermal performances of the enclosure and to protect the heating resistances. In FIG. 7 we find again the elements of the device of FIG. 2 with the same references; but, in microprocessor 53, there is added a second input formed by the input bus 123 which is connected by an analog-digital converter 122 to a thermocouple 12 measuring the temperature of the heating resistance of the electric furnace.

This second input is used by the microprocessor for calculating the controls W to be applied to the graduator as a function of control e determined in the above-described way and of the temperature of the heating resistance TRA. For that, the microprocessor uses preferably the following algorithm, but any other suitable algorithm may be used:

$$W_{(n)} = W_{(n+1)} + GP[\epsilon_{(n)} - \epsilon_{(n+1)}] + GI.T.\epsilon_{(n-1)}$$

with
$\epsilon_{(n)} = e_{(n)} - TRA_{(n)}$
$e_{(n)}$: reference temperature-resistance In this variation, whenever the microprocessor has determined, as previously, the value $e_n$ to be applied, the value $W_{(n)}$ is calculated which will be applied to the control of the heating resistance. This algorithm is the digital realization of PI (proportional, integral) regulator whose proportional gain is GP and integral gain GI; T represents the sampling period.

With this variation, the shift existing between the temperature rise of the heating resistances and the temperature rise of the enclosure of the furnace can be taken into account to prevent the heating resistances from being subject to stresses possibly causing their destruction.

It goes without saying that any variation or modification made to the devices and processes described, within the compass of a man skilled in the art, also form part of the spirit of the invention.

We claim:
1. Method for identifying the model of an enclosure comprising the following steps:
  applying a power rectangular wave front to the enclosure,
  measuring and recording the temperature response of the enclosure to the said power rectangular wave front and computing from the said temperature response, the response time of the enclosure,
  generating an identification signal formed of a multiplicity of square waves having a randomly variable height, said square waves further having a randomly variable width comprised between lower and upper limits which are related to the said response time of the enclosure,
  applying the said identification signal to the enclosure, and measuring by sampling to obtain a plurality of successive samples each having a corresponding rank number, calculating and storing the pulsed response of the enclosure to each of the said square waves,
  calculating the model representing the enclosure from the stored pulsed responses.
2. Method according to claim 1 in which the calculation of the model representing the enclosure from the stored pulsed responses comprises the following steps:
  sampling at constant time intervals the response to the identification signal, thus obtaining a plurality of successive samples each having a corresponding rank number, and calculating from said samples a first multiplicity of first values representative of the pulsed response of the enclosure as a function of time,
  storing said first values in a first series of memories at addresses corresponding to the rank number of the corresponding sample, measuring a second multiplicity of values representative of the variation in the gain of pulsed responses as a function of the operating temperature and storing in a second series of memories said second values at addresses corresponding to the different operating temperatures, storing in a third series of memories a third multiplicity of values representative of the variation of the sampling period as a function of the different operating temperatures, at addresses corresponding to the temperatures.

3. Method according to claim 1 which further comprises a validation and control stage of the model including the following steps:

applying action signals to the enclosures,
calculating by means of the model the response to the signals of the enclosure, and
comparing the calculated response with the measured response.

4. Method according to claim 1, in which the calculation of the pulsed response of the model is effected according to the following identification algorithm:

$$h_i^M(n+1) = h_i^M(n) - \frac{\lambda \epsilon(n) e(n-i)}{E_{(n)}^T E_{(n)}}$$

with:

$$\epsilon(n) = SM_{(n)} - SO_{(n)}$$

$$E_n^T = [e_{n-1}, e_{n-2} \ldots e_{n-N}]$$

and:

$$E_n = \begin{bmatrix} e_{n-1} \\ e_{n-2} \\ e_{n-i} \\ e_{n-N} \end{bmatrix}$$

SO, SM being respectively the object and the model values, $\lambda$ being a constant term comprised between 0 and 2,
$E_n$ being the input vector formed by the values of the input at the sampling times $n-1, n-2, \ldots n-N$,
$e_{n-1}, e_{n-2}, e_{n-i}, e_{n-N}$ being the input values at the sampling times $n-1, n-2, n-i, n-N$,
$h_i^M(n)$ represents the $i^{th}$ component of the mathematical representation of the model at sampling time n.

5. Regulation method of a thermal enclosure by means of a regulation system having a first closed loop and including means for measuring the temperature to be regulated and a regulator element for generating from the values of the measured temperature and a reference point, a control signal and heating means acting on the temperature of the enclosure in response to the control signal, said method comprising the following first set of steps:

measuring the temperature of the enclosure,
calculating the future desired behaviour, as a function of the desired response time of the system functioning in closed loop mode,
estimating, by means of a mathematical model the future development of the temperature of the enclosure and adjusting a future control signal,
applying to the heating means a first adjusted control signal, measuring the temperature of the enclosure and comparing the measured temperature with the estimated values,
applying to the heating means a following control signal in the case of a mismatch or effecting a new calculation, a new estimation and a new adjustment before applying a new first control signal to the heating means;

said mathematical model being obtained by means of an identification procedure which comprises the following stages:

applying a power rectangular wave front to the enclosure,
measuring and recording the temperature response of the enclosure to the said power rectangular wave front and computing from the said temperature response, the response time of the enclosure,
generating an identification signal formed of a multiplicity of square waves having a randomly variable height, said square waves further having a randomly variable width comprised between lower and upper limits which are related to the said response time of the enclosure,
applying the said identification signal to the enclosure and measuring by sampling, thus obtaining a plurality of successive samples each having corresponding rank number, calculating and storing the pulsed response of the enclosure to each of the said square waves,
calculating the model representing the enclosure from the stored pulsed responses.

6. Regulation method according to claim 5, in which said control signal is calculated according to the following algorithm:

$$SMR(n+1) = \alpha SO + (1-\alpha)CONS$$

$$SMR(n+h) = SMR(n+h-1) + (1-\alpha)CONS$$

with $\alpha = e(-T/\tau_r)$ and $h \geq 2$
T being the sampling period,
$\tau_r$ being the desired response time of the system,
SMR(n) being the value of the reference model at the time (n),
SO being the value of the measured object,
CONS being the value of the reference.

7. Regulation method according to claim 5, in which said future control signals are adjusted iteratively according to the following algorithm:

$$e_j^* = e_j - \frac{\lambda \epsilon(n+h-i+1) h_j^M}{HM^T HM}$$

with j varying from 1 to $h-i+1$
i varying from 1 to h
$\lambda$ being a relaxation coefficient
$e_j$ being the value of the $j^{th}$ future control obtained either at the preceding iteration, or by shifting for the first iteration,
$e_j^*$ taking the place of $e_j$ at the following iteration,
$h_j^M$ being a coefficient of the mathematical model,
$\epsilon(n+h-i+1)$ being the predicted difference at time n and at $(h-i+1)$ point of coincidence.

8. Regulation method according to claim 5 further comprising the following second set of steps:
measuring a parameter of the heating means,
calculating and generating a control signal to be applied to the heating means as a function of the measured parameter and of the control signals calculated in the first set of steps.

9. Regulation method according to claim 8, in which the calculation of the control W to be applied to the heating means as a function of control determined in the first set of steps, and of the parameter measured of said heating means, is effected according to the following algorithm:

$$W_{(n)} = W_{(n+1)} + GP[\epsilon_{(n)} - \epsilon_{(n+1)}] + GI.T.\epsilon_{(n-1)}$$

with $$\epsilon_{(n)} = e_{(n)} - TRA_{(n)}$$

$W_n$ being the control value to be applied to the heating means, $e_{(n)}$ being the control value calculated by the first set of steps, GP and GI correspond respectively to gains of a proportional and integral regulator, T is the sampling period, TRA is the value of said measured parameter of the heating means.

* * * * *